United States Patent [19]

Raymond

[11] 4,442,744

[45] Apr. 17, 1984

[54] APPARATUS FOR SUPPLYING PHOTOGRAPHIC SHEET MATERIALS, FOR USE IN A DARKROOM

[76] Inventor: Gary E. Raymond, 755 S. Rainbow Dr., Hollywood, Fla. 33021

[21] Appl. No.: 325,964

[22] Filed: Nov. 30, 1981

[51] Int. Cl.³ ............................................. B26D 5/08
[52] U.S. Cl. ...................................... 83/614; 83/650; 226/110; 271/9; 354/319; 354/339
[58] Field of Search ........................ 83/614, 649, 650; 226/110; 271/9; 354/319, 339

[56] References Cited

U.S. PATENT DOCUMENTS

| | | | |
|---|---|---|---|
| 3,920,238 | 11/1975 | Kitajima | 271/9 |
| 4,014,536 | 3/1977 | Hope | 271/162 |
| 4,067,034 | 1/1978 | Kwiatkowski | 354/319 X |
| 4,245,835 | 1/1981 | Turner | 271/164 X |
| 4,285,607 | 8/1981 | Steinhilber | 271/9 X |
| 4,311,379 | 1/1982 | Falomo | 271/9 X |
| 4,324,480 | 4/1982 | Nomura | 271/9 X |

Primary Examiner—Richard A. Schacher
Attorney, Agent, or Firm—Bernard J. Murphy

[57] ABSTRACT

In the embodiment depicted, the apparatus comprises a housing having an access door and a materials-discharging opening. Within the housing is a support structure for receiving a plurality of cassettes of photographic sheet material, such as photosensitive paper and negative stock. To the support structure are mounted a plurality of platforms which grip the cassettes, and a plurality of chutes for conveying the sheet materials from the cassettes to the discharging opening. Rollers intrude into the chutes and define nips which grasp the sheet material and a handwheel fixed to one roller of pairs thereof is used to advance the sheet material along the chutes. A bladed cutter is reciprocatingly supported by the housing, in immediate adjacency to the discharging opening, for severing thereat lengths of sheet material which are passed therethrough.

14 Claims, 7 Drawing Figures

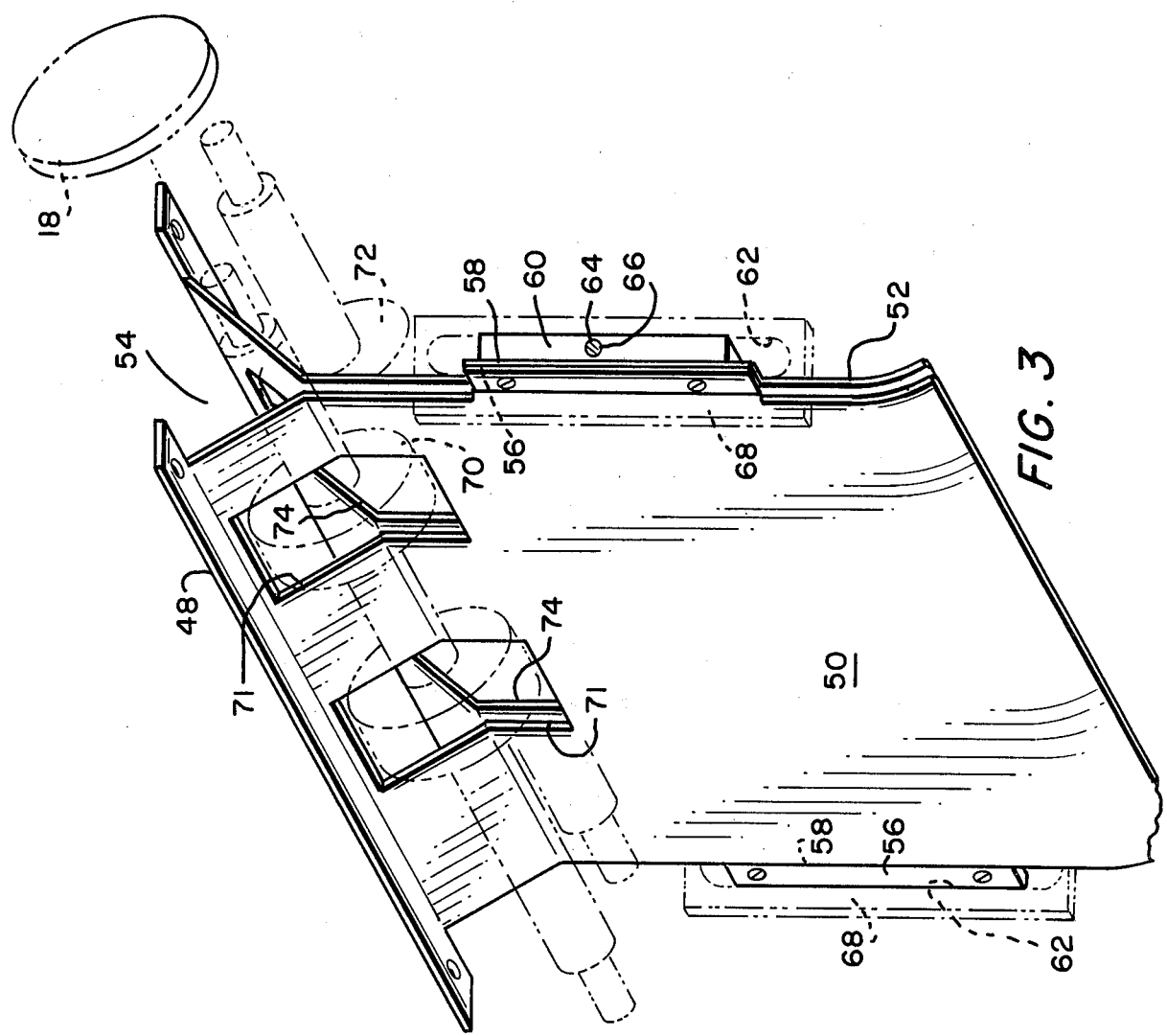
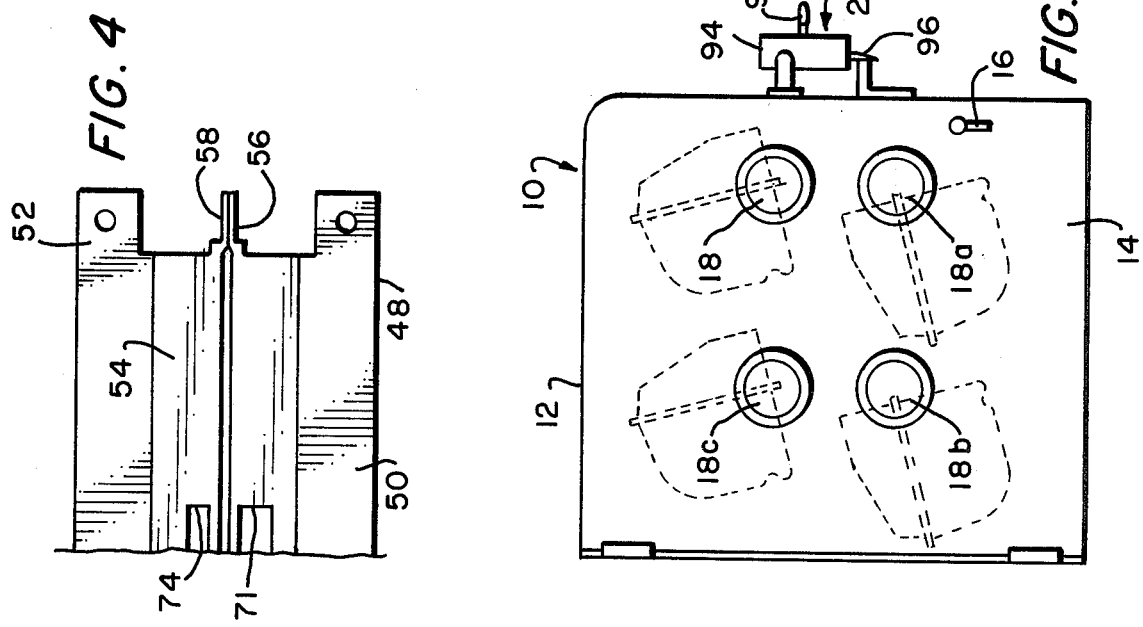

APPARATUS FOR SUPPLYING PHOTOGRAPHIC SHEET MATERIALS, FOR USE IN A DARKROOM

This invention pertains to apparatuses for supplying photographic sheet materials, such as photosensitive paper and negative stock, and in particular to a novel apparatus of the aforesaid type which compactly confines a plurality of sheet material cassettes, and provides means for (a) choosing a supply of sheet material from any one of the cassettes, and (b) discharging all the sheet material, from all of the cassettes, through a common discharge opening. Further, the invention pertains to such an apparatus which has, in addition, a cutter fixed thereto, in adjacency to said common discharge opening, for severing the discharged sheet material.

It is an object of this invention to set forth an apparatus for supplying sheet materials, for use in a darkroom or elsewhere, comprising a housing having a materials-discharging opening formed therein; means fixed within said housing for supporting a plurality of sheet material cassettes; said supporting means comprising means defining a plurality of platforms; chutes mounted within said housing for conveying photographic sheet materials therealong from said platforms to said opening; and means, mounted in said housing in adjacency to said chutes, operative for gripping photographic sheet materials and moving such materials along said chutes to said opening.

Further objects of this invention, as well as the novel features thereof, will become more apparent by reference to the following description, taken in conjunction with the accompanying figures, in which:

FIG. 1 is an elevational view of the front of the novel apparatus;

FIG. 3 is an isometric projection of one of the chutes;

FIG. 4 is a fragmentary, plan view of the chute of FIG. 3;

Figure 2:
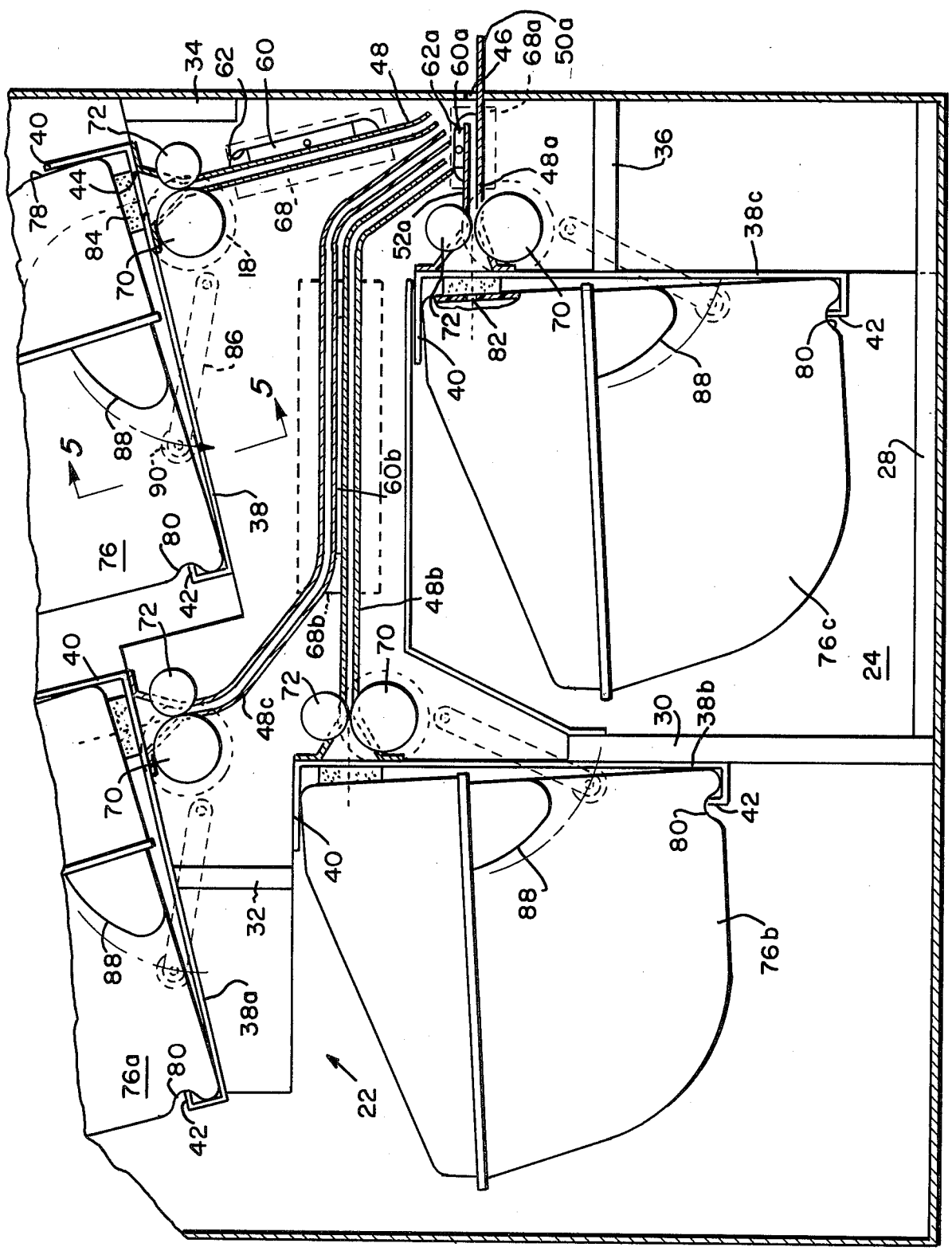
FIG. 2 is an enlarged, elevational view of the inside of the housing of the apparatus, the access door being removed for clarity, and the cutter mechanism being omitted.

As shown in the figures, the novel apparatus 10 comprise a housing 12 having an access door 14 hinged thereto, and a door latch 16. Through the door 14 project a plurality of roller handwheels 18, 18a, 18b and 18c. Fixed to the right side of the housing 12 is a cutter mechanism 20.

Within the housing 12 is a support structure 22 which comprises a pair of parallel, spaced-apart walls 24 and 26. With respect to FIG. 2, wall 24 comprises a rear wall, and the mating front wall 26 is omitted for clarity. Structure 22 has a base 28, a panel 30, and struts 32, 34 and 36. The latter five, cited elements traverse the housing 12 and are secured, at ends thereof, to the walls 24 and 26.

Bridging across the walls 24 and 26, and fixed at ends thereof to said walls, are a plurality of platforms 38, 38a, 38b and 38c. At one end of each of the platforms is a right-angular wall 40, and at the opposite end thereof is an inwardly-directed rib 42. Each platform further has an elongate void 44 formed therethrough which traverses a substantial portion of the platform. Chutes, for conveying photographic sheet materials, through the voids 44 to a materials-discharging opening 46 formed in the housing 12, are fixed in association with each of the platforms 38 . . . 38c.

Chute 48 is fastened to platform 38, and as the former is similarly structured and supported within the housing as are all the other chutes 48a, 48b and 48c, only it will be described in detail.

Chute 48 comprises a pair of parallel plates 50 and 52. At one end, the plates 50 and 52 are flared out to define a funnel-type throat 54. At opposite sides of the plates, right-angular tabs 56 and 58 are spot-welded together, the tabs defining right-angles to provide a uniform space between the plates 50 and 52 through which sheet materials may pass. Fasteners passed through the welded tabs 56 and 58 secure thereto spacers 60 (only one being shown). Walls 24 and 26 have elongate cut-outs 62 (only one being shown) formed therein, and the tabs 56 and 58, with the spacers 60 fastened thereto, are snugly positioned in the cut-outs 62. The spacers 60 each have a bolt hole 64 formed therein, and a bolt 66 is fastened therein and to a plate 68. The plate(s) 68 are disposed on the outer sides of the walls 24 and 26, and held fast by the bolts 66 to close off the cut-outs 62 from external light. The funnel-type throat end of the chute 48 is fastened to the platform 38 so that the throat 54 is astride the void 44. The opposite end of the chute 48 terminates in close adjacency to the materials-discharging opening 46.

The plates 50 and 52 are apertured to admit rollers thereinto. A feed roller 70, having a pair of separated roller elements which intrude into apertures 71 in plate 50, engages a pressure roller 72. Roller 72 also has a pair of separated roller elements which intrude into apertures 74 in plate 52. The roller elements form a nip within which to clasp photographic sheet material introduced thereinto. The handwheel 18 is fastened to the feed roller 70 and used to advance sheet material from the rollers 70 and 72 to the chute 48.

Each platform 38 . . . 38c has a sheet material cassette 76, 76a, 76b and 76c mounted thereon. Each cassette is like the others thereof, so cassette 76 only will be described in detail. Cassette 76 has a flat, bearing surface 78 at one end thereof, and a longitudinal, traversing recess 80 formed in the opposite end thereof. To mount the cassette 76 onto the platform 38, the rib 42 is engaged with the recess 80, and the bearing surface 78 is forced into fast, frictional engagement with the right-angular wall 40.

Each cassette 76 . . . 76c has a sheet material slot 82 formed therein, in the base thereof, for aligned registry with the void 44 and throat 54. The cassettes are supplied with a leader strip extending therefrom, such leader strip having sufficient length to reach into the nip of the rollers 70 and 72. Intervening between the base of the cassette 76 (or 76a, 76b, 76c) and the platform (38a, 38b, 38c) is a light-seal, resilient material 84. The material 84 comprises a pair of longitudinal strips which are intimately juxtapositioned, astride the slot 82, and are cemented to the platform 38. The leader strip protrudes through the pair of light-seal strips of material 84.

Figure 5:
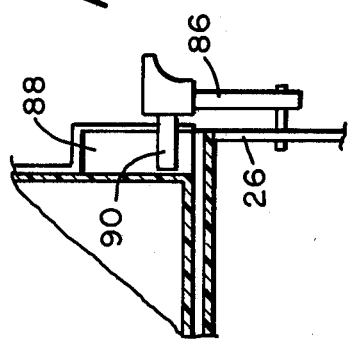
FIG. 5 is a fragmentary, cross-sectional view, taken along section 5—5 of FIG. 2, showing the cassette land and latching means.

To constrain the cassettes into a light-tight engagement with the light-seal material 84, latches 86 are provided to engage lands 88 formed on the ends of the cassettes 76 . . . 76c. With particular reference to FIGS. 2 and 5, it will be seen that the front wall 26 pivotably supports a latch 86 in adjacency to each of the cassettes. Further, each cassette has an arcuate-surfaced, prominent land 88 projecting from the sides thereof (only one of the sides being shown). The latch 86 has a latching pin 90 projecting therefrom which, as the latch 86 is slued through an arc, comes into compressive engagement with the arcuate surface of the land. Such engagement presses the foward end (i.e., the end with the flat bearing surface 78) down onto the light-seal material 84.

Figure 6:
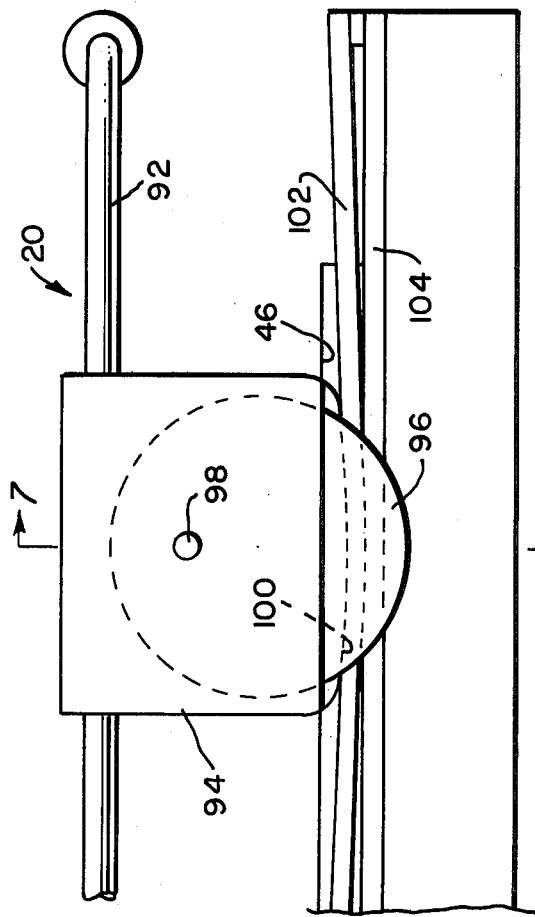
FIG. 6 is an elevational view of a portion of the cutter mechanism.
Figure 7:
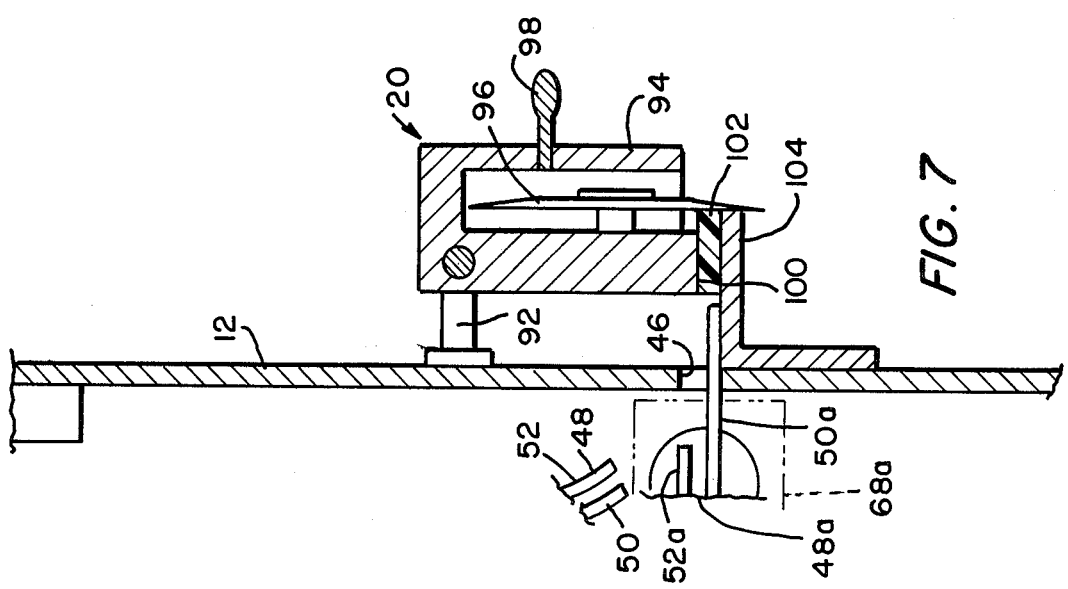
FIG. 7 is a cross-sectional view taken along section 7—7 of FIG. 6.

As shown in FIGS. 1, 6 and 7, the invention comprehends the incorporation of a cutter mechanism 20, mounted in immediate adjacency to the opening 46 in the housing 12. The mechanism 20 comprises a rod 92 fixed to the housing, in traverse thereof, and a bored blade carrier 94 movable along the rod. Rotatably supported within the carrier 94 is a flat, circular blade 96. A handle 98 extends from the carrier for manipulation thereof. The carrier 94 has an underlying, linear surface 100 which serves as a means for constraining a clamping strip 102 toward a flat, linear-edged support 104. The strip 102 is supported, at opposite ends (only one being shown), in a slight elevation above the support 104. Accordingly, sheet material passed through the opening 46 slides under the strip—with the blade 96 and carrier 94 being at one of the ends of travel along rod 92. Then, as the blade and carrier are advanced toward the fed-through sheet material, the constraining surface 100 forces the strip 102 into clamping engagement with the material, to hold the latter fast against the support 104 for a clean severance. The blade 96, of course, travels along the edge of the support 104 and severs the material.

While I have described my invention in connection with a specific embodiment thereof, it is to be clearly understood that this is done by way of example, and not as a limitation to the scope of my invention, as set forth in the objects thereof. For example, other cutting mechanisms may be employed, if desired, such as a vertically-moving blade, or a horizontally-moving knife. Too, I show a plurality of four cassettes 76 . . . 76c arranged in efficient positioning with chutes 48 . . . 48c therefor. Clearly, my invention can be practiced with two, three, five, or any number of such cassettes and chutes. The cassettes 76 . . . 76c need not have lands 88; in lieu thereof they could have grooves into which the pin 90 would have access, a given side of the groove defining a land with which the pin makes compressive engagement. The latches 86, also, could be supplanted with other types which, being spring-loaded, or the like, simply extend and clasp a cassette-provided land. All such refinements or modifications of my invention clearly proceed from my teaching herein, and are deemed to be within the scope of my invention and embraced by the following claims.

I claim:

1. Apparatus for supplying photographic sheet materials, for use in a darkroom, comprising:
    a housing having a material-discharging opening formed therein;
    means fixed within said housing for supporting a plurality of sheet material cassettes;
    said supporting means comprising means defining a plurality of platforms;
    chutes mounted within said housing for conveying photographic sheet materials therealong from said platforms to said opening; and
    means mounted in said housing in adjacency to said chute, operative for gripping photographic sheet materials and moving such materials along said chutes to said opening; wherein
    said platforms comprise means for gripping opposite sides of sheet material cassettes; and further including
    means coupled to said supporting means for latchingly engaging sheet material cassettes and securing them to said platforms; and
    a given plurality of sheet material cassettes; wherein
    said platforms comprise a same given plurality as said cassettes;
    each one of said cassettes being disposed upon one of said platforms;
    each of said cassettes having a flat bearing surface at a forward end thereof, and means defining a relief at the opposite, rear end thereof; and
    said gripping means comprises a flat wall in confronting, frictional engagement with said flat bearing surface of a cassette disposed on the respective platform, and a rib in fast engagement with said relief of such disposed cassette; wherein
    each of said cassettes has means formed thereon defining a prominent land; and
    said latchingly-engaging means comprises a latch, movable relative to said supporting means, having a limb which, upon said latch being moved, effects a compressive engagement, and releasing disengagement, with said land.

2. Apparatus, according to claim 1, wherein:
    said platforms comprise means defining a void in each thereof;
    each of said chutes comprises means defining a diverging throat at an end thereof and a pair of spaced-apart, parallel walls extending outwardly from said throat; and
    each one of said chutes has said throat thereof in immediate adjacency to said void in one of said platforms.

3. Apparatus, according to claim 1, wherein:
    said sheet materials gripping and moving means comprises rollers.

4. Apparatus, according to claim 3, wherein:
    said chutes have cut-outs formed therein; and
    said rollers intrude into said cut-outs and define a nip within said walls.

5. Apparatus, according to claim 1, wherein:
    said supporting means comprises means for supporting not less than four sheet material cassettes;
    said chutes comprise not less than four thereof.

6. Apparatus, according to claim 2, wherein:
    said chutes each have the throat thereof fixed to one of said platforms astride said void in said platform.

7. Apparatus, according to claim 3, wherein:
    said rollers comprises a pair of rollers mounted in adjacency to each of said chutes; and
    one of said rollers of said pairs has a handwheel fixed integrally thereto at an end thereof.

8. Apparatus, according to claim 1, wherein:
    said supporting means includes a pair of spaced apart, vertical walls; and
    said platforms are fixed to said pair of vertical walls, and bridge thereacross.

9. Apparatus, according to claim 8, wherein:
    said chutes are fixed to said platforms, and traverse said housing.

10. Apparatus, according to claim 1, wherein:
    said platforms further comprise means defining a void in each thereof;

each of said cassettes has a sheet material-discharging slot formed therein; and said slot in each said cassette is in aligned registry with said void in a corresponding platform upon which each said cassette is disposed.

11. Apparatus, according to claim 10, further including:

light occluding means, interposed between said cassettes and their respective platforms, astride said slots.

12. Apparatus, according to claim 1, further including:

cutting means, fixed to said housing in immediate adjacency to said opening, for severing sheet materials which pass through said opening.

13. Apparatus, according to claim 12, wherein:

said cutting means comprises a rigid support upon which to receive sheet materials;

said rigid support having a linear edge;

a cutting blade supported for movement along said edge; and clamping means for constraining sheet materials upon said rigid support and holding such materials fast thereon to enable clean, efficient cutting thereof.

14. Apparatus, according to claim 13, wherein:

said cutting means further includes a carrier in which said blade is supported; and said carrier comprises means for constraining said clamping means against said rigid support.

* * * * *